United States Patent
Hoefken

(10) Patent No.: US 9,586,161 B2
(45) Date of Patent: Mar. 7, 2017

(54) DEVICE FOR DECANTING A SUPERNATANT RECEIVED IN A CLARIFIER

(71) Applicant: INVENT UMWELT- UND VERFAHRENSTECHNIK AG, Erlangen (DE)

(72) Inventor: Marcus Hoefken, Erlangen (DE)

(73) Assignee: INVENT UMWELT—UND VERFAHRENSTECHNIK AG, Erlangen (DE)

( * ) Notice: Subject to any disclaimer, the term of this patent is extended or adjusted under 35 U.S.C. 154(b) by 385 days.

(21) Appl. No.: 14/396,564

(22) PCT Filed: Mar. 20, 2013

(86) PCT No.: PCT/EP2013/055835
§ 371 (c)(1),
(2) Date: Oct. 23, 2014

(87) PCT Pub. No.: WO2013/160030
PCT Pub. Date: Oct. 31, 2013

(65) Prior Publication Data
US 2015/0114892 A1    Apr. 30, 2015

(30) Foreign Application Priority Data
Apr. 27, 2012 (DE) .......... 10 2012 207 146

(51) Int. Cl.
*B01D 21/24* (2006.01)
*B01D 21/34* (2006.01)
(Continued)

(52) U.S. Cl.
CPC ......... *B01D 21/34* (2013.01); *B01D 21/2405* (2013.01); *B01D 21/2444* (2013.01); *G05D 9/12* (2013.01); *C02F 2001/007* (2013.01)

(58) Field of Classification Search
None
See application file for complete search history.

(56) References Cited

U.S. PATENT DOCUMENTS 2,021,247 A * 11/1935 Waugh .................... C02F 1/686
                                              137/101.21
4,154,678 A    5/1979 Kole
(Continued)

FOREIGN PATENT DOCUMENTS

DE    7038786 U    1/1971
DE    8623253 U1   10/1986
(Continued)

OTHER PUBLICATIONS

PCT, "International Preliminary Report on Patentability for International Application No. PCT/EP2013/055835."
(Continued)

*Primary Examiner* — Terry Cecil
(74) *Attorney, Agent, or Firm* — Manabu Kanesaka

(57) ABSTRACT

A device for decanting a supernatant includes a decanter which is pivotally attached to a clarifier and which includes a decanter head that has a water inlet opening, a pivoting device which is connected to the decanter via an actuator with an adjustable length for raising and lowering the water inlet opening relative to a floor of the clarifier, a first measuring device for measuring a fill level of the wastewater received in the clarifier, a device for determining a length of the actuator, an evaluating device with which a distance of the water inlet opening of the decanter to the floor of the clarifier can be determined from the length of the actuator, and a controller for controlling the pivoting device such that a water inlet opening immersion depth, which results from the difference between the fill level and the distance, is kept in a specified range.

8 Claims, 5 Drawing Sheets

(51) Int. Cl.
 *G05D 9/12* (2006.01)
 *C02F 1/00* (2006.01)

(56) References Cited

U.S. PATENT DOCUMENTS

| | | |
|---|---|---|
| 4,693,821 A | 9/1987 | Goronszy et al. |
| 7,871,516 B2 | 1/2011 | Hoefken |
| 2009/0236278 A1 | 9/2009 | Hoefken |

FOREIGN PATENT DOCUMENTS

| | | |
|---|---|---|
| DE | 19636153 A1 | 3/1998 |
| DE | 10 2009 042 292 B3 | 1/2011 |
| EP | 0128122 A1 | 12/1984 |
| EP | 0979668 A2 | 2/2000 |
| WO | 95/23638 A1 | 9/1995 |

OTHER PUBLICATIONS

PCT, "International Search Report for International Application No. PCT/EP2013/055835"

\* cited by examiner

DEVICE FOR DECANTING A SUPERNATANT RECEIVED IN A CLARIFIER

RELATED APPLICATIONS

The present application is National Phase of International Application No. PCT/EP2013/055835 filed Mar. 20, 2013, and claims priority from German Application No. 10 2012 207 146.6, filed Apr. 27, 2012, the disclosure of which is hereby incorporated by reference herein in its entirety.

The invention relates to a device for decanting a supernatant received in a clarifier according to the preamble of Claim 1.

Such a device is known for example from WO 2008/014856.

According to the prior art, it is also generally known to attach a hydrostatic sensor to the decanter head. The hydrostatic sensor is connected via a cable to a controller provided outside the clarifier. A motor for driving the cable winch in accordance with the signals delivered from the hydrostatic sensor is controlled by means of the controller, such that an immersion depth of a water inlet opening provided on the decanter head is kept in a predefined range.

In practice, the hydrostatic sensor sometimes fails or the cable provided between the hydrostatic sensor and the controller is sometimes damaged. In the case of damage to the cable, this may also result in damage to the controller.

The object of the invention is to overcome the disadvantages according to the prior art. In particular, a device for decanting a supernatant received in a clarifier is to be specified, which device is not susceptible to faults and is robust. In accordance with a further objective of the invention, it is to be possible to produce the device with simplified complexity of manufacture.

This object is achieved by the features of Claim 1. Expedient embodiments of the invention will emerge from the features of Claims 2 to 8.

In accordance with the invention, the generic device for decanting a supernatant received in a clarifier comprises the following features:

a first measuring device for measuring a fill level of the wastewater received in the clarifier, a device for determining a length of the actuator, an evaluating device with which a distance of the water inlet opening of the decanter to the floor of the clarifier can be determined from the length of the actuator, and a controller for controlling the pivoting device such that a water inlet opening immersion depth, which results from the difference between the fill level and the distance, is kept in a specified range.

In contrast from the prior art, it is possible with the proposed device to dispense with the provision of a hydrostatic sensor on the decanter head. Consequently, a susceptibility to faults or repair of conventional devices caused as a result of said sensor can be avoided. The proposed device according to the invention is of simple structure, robust and is not susceptible to faults. With the device according to the invention, all parameters necessary for determining the immersion depth can be measured by means of measuring devices, which are fitted outside the wastewater received in the clarifier. There is no need for an undesirable laying of cables through the wastewater received in the clarifier. The proposed device is characterised by a lower complexity of manufacture and assembly.

The actuator with adjustable length may be a hydraulically adjustable pipe, an actuator adjustable for example by means of a spindle drive or the like, etc. In accordance with a particular advantageous embodiment, the actuator is selected from the following group: cable, belt, chain. In this case, the pivoting device comprises a winch for receiving such an actuator. To drive the winch, an electric motor or a hydraulic motor can be provided. The proposed actuator and also the proposed pivoting device are robust and are not susceptible to faults and are additionally available relatively cost-efficiently.

In particular with use of a belt, a first width of the winch may correspond approximately to a second width of the belt, such that the belt is received on the winch substantially congruently. The use of a belt and a winch corresponding thereto enables a reproducible winding and unwinding. The immersion depth of the water inlet opening can thus be controlled particularly precisely.

In accordance with a further embodiment, the device for determining the length of the actuator comprises a second measuring device for measuring an angle of rotation of the winch. Such a measuring device is conventionally available. For example, said measuring device may be provided on a motor, a gearing provided downstream of the motor where applicable, or on the winch itself. The second measuring device for example comprises a perforated or slitted disc and an optical detector, with which, in the case of a rotation of the perforation or slitted disc, an angle of rotation can be determined from the determined number of holes or slits. Other suitable measuring devices for example comprise a disc with magnetic markings and a detector or the like corresponding thereto. The use of motion sensors, for example gyro sensors or the like, is also conceivable.

The respective length of the actuator can be determined from the measurement of the angle of rotation. The angle of rotation and the length of the actuator determined from said angle again correspond to the distance. In the case of the use for example of a belt and a winch, there is no linear relationship between the angle of rotation and the length of the actuator or the distance. In this case, a corresponding correction function is stored in the evaluating device, with which correction function the respective distance can be determined from the measured angle of rotation. Such a correction function can be fixedly defined. However, said correction function may also be calculated on-site by measuring a maximum and a minimum pivot position of the decanter and can be stored in the evaluating device. It is thus possible in a particularly simple manner to adapt the controller to the respective conditions. The evaluating device may comprise a control stage with which the immersion depth can be controlled.

In accordance with a further embodiment, the controller comprises a first switching function, with which an operation of the pivoting device is interrupted when a predefined upper position of the decanter head is reached. Further, the controller may comprise a second switching function, with which an operation of the pivoting device is interrupted when a predefined lower position of the decanter head is reached. The switching functions can be programmable, for example. However, suitable switching elements for detecting the upper and the lower position of the decanter head can also be provided. With the proposed switching functions, a pivot operation outside a predefined pivot range of the decanter is avoided securely and reliably. This contributes further to the lack of susceptibility to faults of the device.

An embodiment of the invention will be explained in greater detail on the basis of the drawings, in which.

Figure 3:
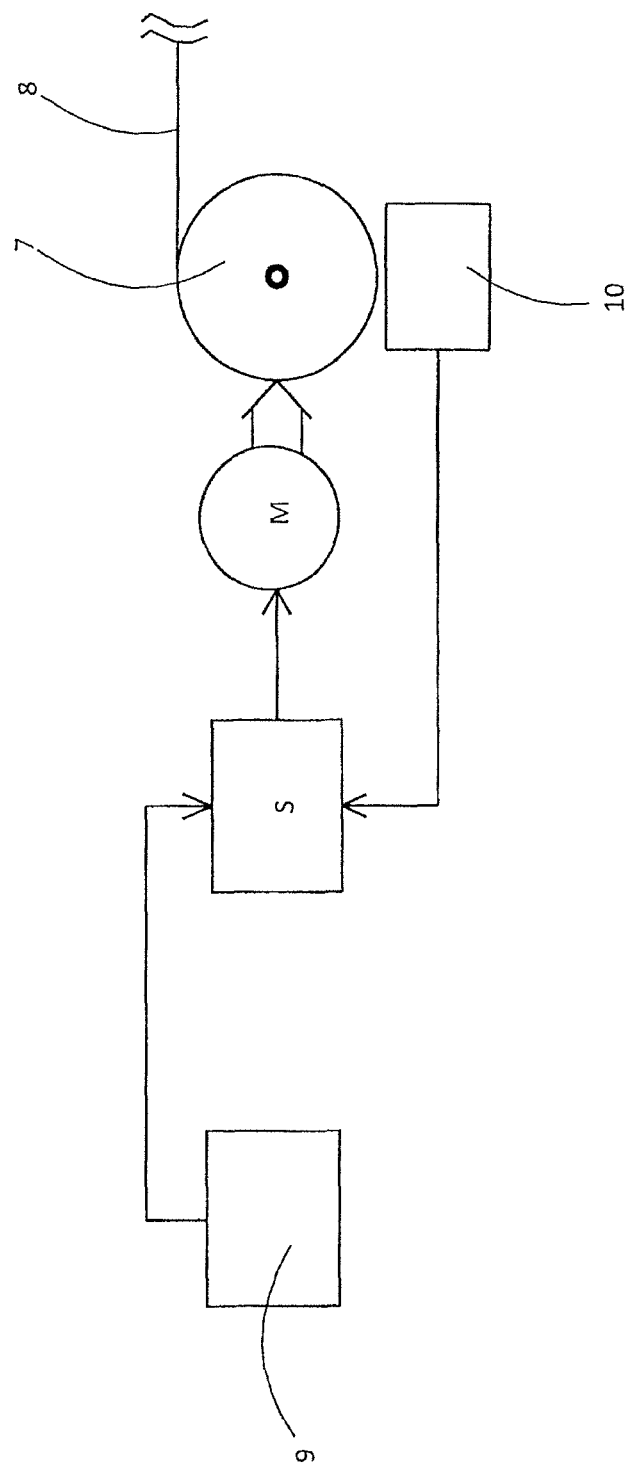
Figure 4:
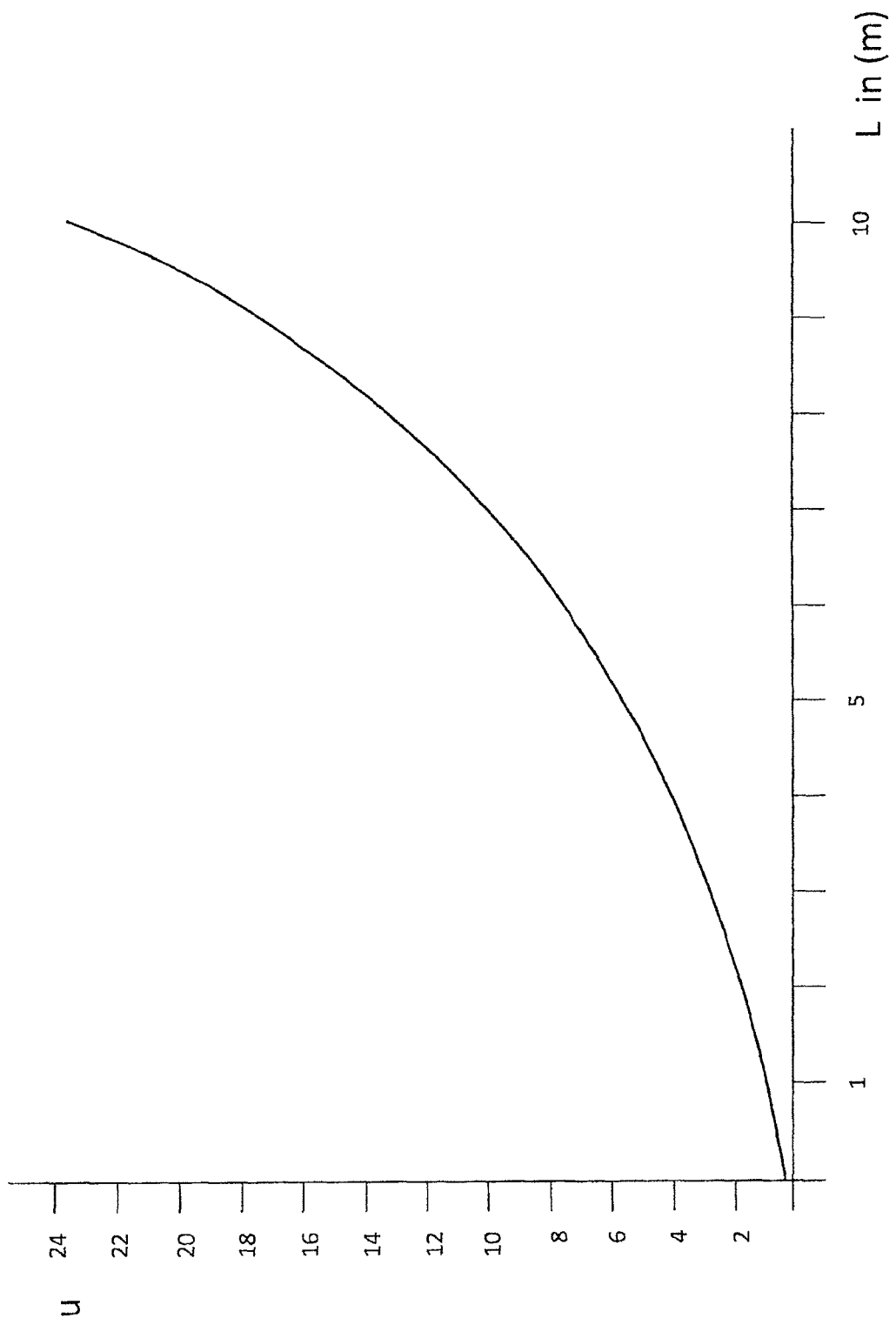
Figure 5:
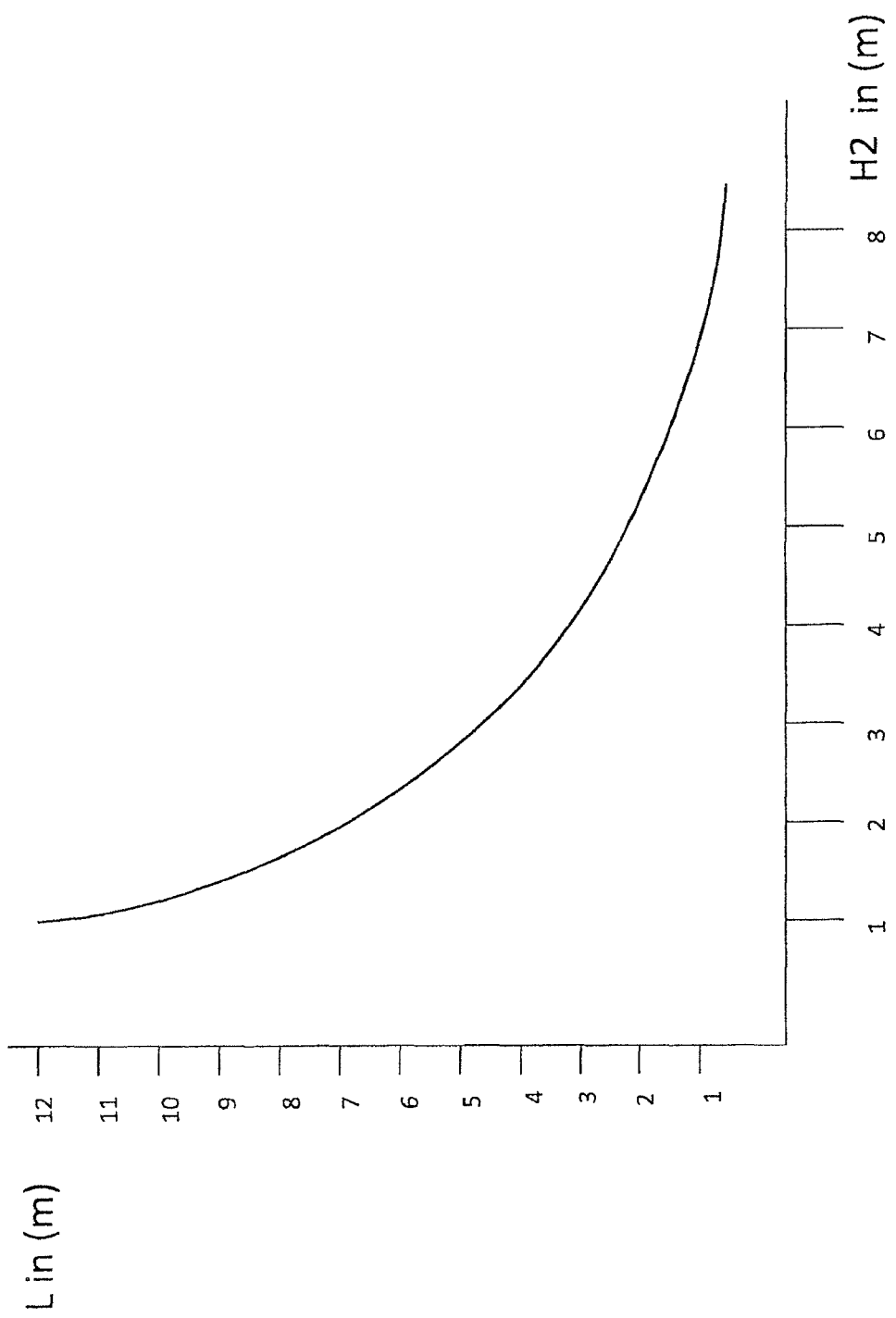

FIG. 3 schematically shows a block diagram of a controller,

FIG. 4 schematically shows the length of the actuator over the number of revolutions of the winch, and FIG. 5 schematically shows the distance over the number of revolutions of the winch.

Figure 1:
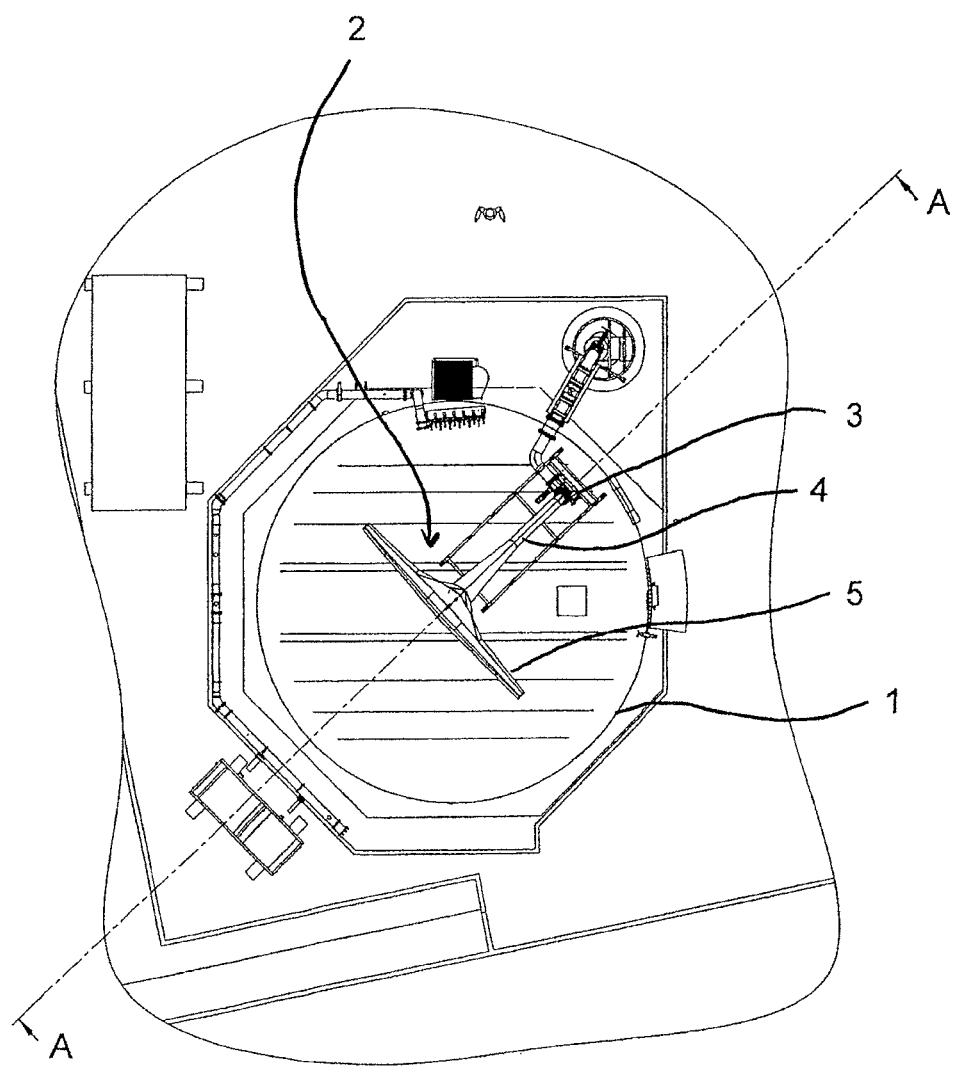
FIG. 1 shows a plan view of a device according to the invention.
Figure 2:
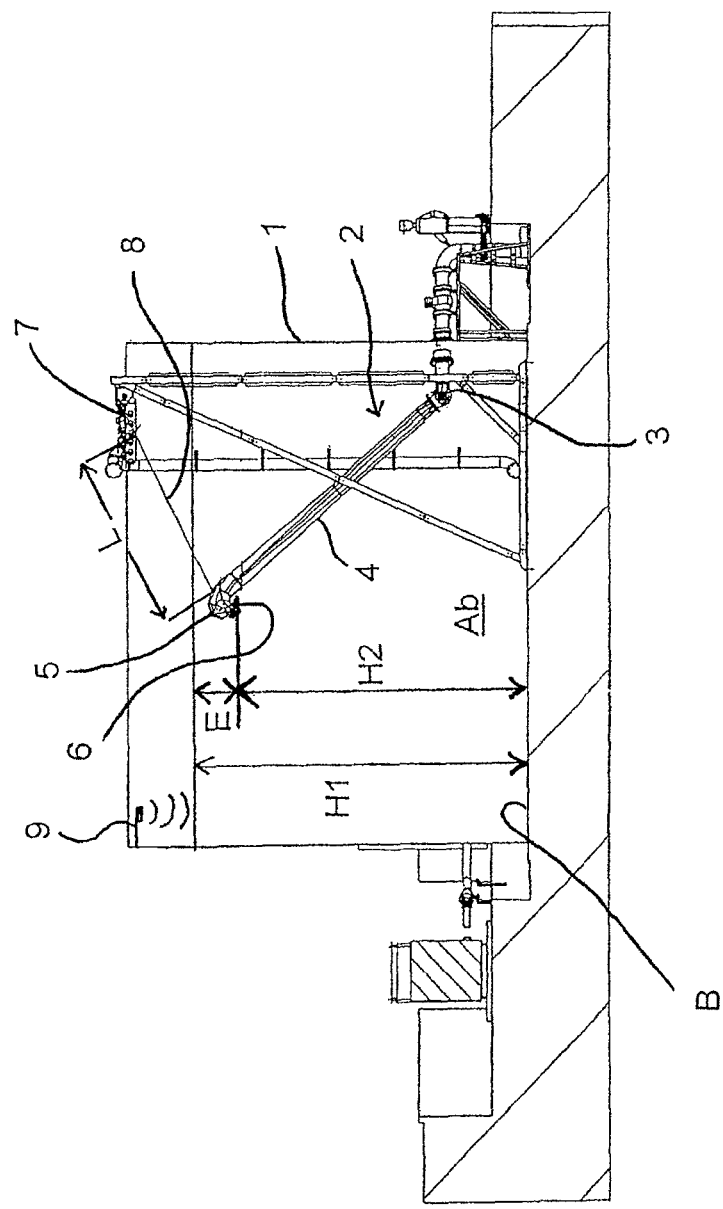
FIG. 2 shows a sectional view according to the line of section A-A in FIG. 1.

In FIGS. 1 and 2 a decanter 2 is held pivotally at one end thereof on a pivot bearing 3 in a clarifier 1. The decanter 2 has a pipe 4 extending from the pivot bearing 3 and a decanter head 5 arranged at the second end of the pipe 4 and extending perpendicularly thereto. The decanter head 5, on the underside thereof facing a floor B of the clarifier 1, has a water inlet opening 6. Reference sign 7 denotes a winch, on which a cable 8 connected to the decanter head 5 is received. Reference sign L denotes a length of the actuator or of the cable 8. The length L describes the respective distance between the decanter head 5 and the pivoting device or the winch 7.

Reference sign 9 denotes a first measuring device for measuring the fill level H1 of wastewater Ab received in the clarifier 1. The first measuring device may be an ultrasound or radar measuring device. A distance between the water inlet opening 6 and the floor B is denoted by reference sign H2. The immersion depth E of the water inlet opening 6 denoted by reference sign E is given from the difference between the fill height H1 and the distance H2. The immersion depth is expediently kept, in practice, in a range from 30 to 80 cm, preferably from 40 to 70 cm.

FIG. 3 schematically shows a block diagram of a controller S. The controller S may be a conventional process computer controller. Reference sign 10 denotes a second measuring arrangement, with which an angle of rotation of the winch 7 is measured and transmitted to the controller S. The fill height H1 is measured with the first measuring device 9 and a corresponding signal is also transmitted to the controller S.

By means of the controller S, the distance H2 is determined from the angle of rotation measured by the second measuring device 10. Further, a difference between the fill level H1 and the distance H2 is calculated with the controller S. An immersion depth E given therefrom is compared with a predefined value of the immersion depth E. In accordance with the result attained with the comparison, the motor M provided to drive the winch 7 is actuated such that the immersion depth E is set to the predefined value of the immersion depth E.

FIG. 4 schematically shows the unwound length L of the cable 8 or of the actuator over the number of revolutions U of the winch 7. With decreasing number of revolutions U of the winch 7, the diameter thereof increases due to the cable 8 wound thereon. The length L of the cable 8 decreases per revolution U of the winch 7 with increasing number of revolutions U.

FIG. 5 schematically shows the distance H2 over the length L of the actuator 8. The distance H2 and the length L of the actuator have a trigonometric relationship with one another.

With use of the functions shown in FIGS. 4 and 5, the distance H2 can be determined from the respective angle of rotation of the winch 7. In FIGS. 4 and 5, the respective angle of rotation is given by multiplying the number of revolutions of the winch 7 by 360°.

LIST OF REFERENCE SIGNS 1 clarifier
2 decanter
3 pivot bearing
4 pipe
5 decanter head
6 water inlet opening
7 winch
8 cable
9 first measuring device
10 second measuring device
Ab wastewater
B floor
E immersion depth
H1 fill level
H2 distance
L length
M motor
S controller

The invention claimed is:

1. A device for decanting a supernatant received in a clarifier, comprising:
    a decanter which is pivotally attached to a clarifier and which comprises a pipe, of which one end is held pivotally in a pivot bearing and at the other end of which a decanter head extending perpendicularly thereto and having a water inlet opening is provided,
    a pivoting device which is connected to the decanter via an actuator with an adjustable length for raising and lowering the water inlet opening relative to a floor of the clarifier,
    a first measuring device for measuring a fill level of the wastewater received in the clarifier,
    a device for determining a length of the actuator,
    an evaluating device with which a distance of the water inlet opening of the decanter to the floor of the clarifier can be determined from the length of the actuator, and
    a controller for controlling the pivoting device such that a water inlet opening immersion depth, which results from the difference between the fill level measured with the measuring device and the distance determined by means of the evaluating device, is kept in a specified range.

2. The device according to claim 1, wherein the actuator is selected from the following group: cable, belt, chain, and wherein the pivoting device comprises a winch for receiving such an actuator.

3. The device according to claim 2, wherein an electric motor or a hydraulic motor is provided to drive the winch.

4. The device according to claim 2, wherein, with use of a belt, a first width of the winch corresponds approximately to a second width of the belt, such that the belt is received on the winch substantially congruently.

5. The device according to claim 1, wherein the device for determining the length of the actuator comprises a measuring device for measuring an angle of rotation of the winch.

6. The device according to claim 1, wherein the evaluating device comprises a control stage, with which the immersion depth can be controlled.

7. The device according to claim 1, wherein the controller comprises a first switching function, with which an operation of the pivoting device is interrupted when a predefined upper position of the decanter head is reached.

8. The device according to claim 7, wherein the controller comprises a second switching function, with which an operation of the pivoting device is interrupted when a predefined lower position of the decanter head is reached.

* * * * *